(12) United States Patent
Göpfert et al.

(10) Patent No.: US 12,545,132 B2
(45) Date of Patent: Feb. 10, 2026

(54) ACTUATING MECHANISM FOR ACTUATING COVERS FOR VEHICLES

(71) Applicant: Illinois Tool Works Inc., Glenview, IL (US)

(72) Inventors: Tobias Göpfert, Würzburg (DE); Matthias Hegwein, Ippesheim (DE); Thomas Lechner-Watzlik, Weikersheim (DE); Joachim Oberst, Großrinderfeld (DE); Roland Och, Rottendorf (DE)

(73) Assignee: Illinois Tool Works Inc., Glenview, IL (US)

( * ) Notice: Subject to any disclaimer, the term of this patent is extended or adjusted under 35 U.S.C. 154(b) by 322 days.

(21) Appl. No.: 18/367,314

(22) Filed: Sep. 12, 2023

(65) Prior Publication Data

US 2024/0110427 A1  Apr. 4, 2024

(30) Foreign Application Priority Data

Oct. 4, 2022 (DE) ...................... 10 2022 125 527.1
Feb. 14, 2023 (DE) ...................... 10 2023 103 567.3

(51) Int. Cl.
*B60L 53/16* (2019.01)
*B60K 15/05* (2006.01)
(Continued)

(52) U.S. Cl.
CPC .............. *B60L 53/16* (2019.02); *B60K 15/05* (2013.01); *G01D 11/245* (2013.01);
(Continued)

(58) Field of Classification Search
CPC ... B60L 53/16; B60K 15/05; B60K 2015/053; B60K 2015/0538; G01D 11/245; G01S 7/4813; G01S 17/931
(Continued)

(56) References Cited

U.S. PATENT DOCUMENTS

| 4,867,501 A | 9/1989 | Nomura |
|---|---|---|
| 6,923,481 B2 | 8/2005 | Bruderick |

(Continued)

FOREIGN PATENT DOCUMENTS

| CN | 108843162 A | 11/2018 |
|---|---|---|
| CN | 108979368 A | 12/2018 |

(Continued)

*Primary Examiner* — Hai H Huynh
(74) *Attorney, Agent, or Firm* — McAndrews, Held & Malloy, Ltd.

(57) ABSTRACT

Described is an actuating mechanism for actuating a cover of a vehicle. The cover is reversibly movable between a closed position where the cover is arranged flush with a vehicle outer shell and an open position where the cover is arranged at least partially or regionally behind the vehicle outer shell. The actuating mechanism comprises a movement mechanism operatively connected to the rear side of the cover. In order to transition the cover from the closed position into the open position proceeding from the closed position of the cover, the movement mechanism moves the cover initially into an intermediate position in a rotational and translational movement in which intermediate position the cover is pivoted relative to the closed position of the cover about a first axis of rotation and is at least partially or regionally offset in comparison to the closed position backwards towards the interior of the vehicle. Proceeding from the intermediate position of the cover, the movement mechanism pivots the cover in an at least substantially and preferably purely rotational movement about a second axis of rotation into the open position, in which the cover is arranged at least partially or regionally behind the vehicle body and in particular behind the vehicle outer shell.

18 Claims, 7 Drawing Sheets

(51) Int. Cl.
*G01D 11/24* (2006.01)
*G01S 7/481* (2006.01)
*G01S 17/931* (2020.01)

(52) U.S. Cl.
CPC ...... *G01S 7/4813* (2013.01); *B60K 2015/053* (2013.01); *G01S 17/931* (2020.01)

(58) Field of Classification Search
USPC ...................................................... 296/97.22
See application file for complete search history.

(56) References Cited

U.S. PATENT DOCUMENTS

| | | | |
|---|---|---|---|
| 7,062,945 | B2 | 6/2006 | Saitoh |
| 7,404,588 | B2 | 7/2008 | Gabsch |
| 8,089,228 | B2 | 1/2012 | Ballard |
| 8,443,553 | B1 | 5/2013 | Polewarczyk |
| 9,062,478 | B2 | 6/2015 | Bingle |
| 9,156,335 | B1 | 10/2015 | Harter |
| 9,643,487 | B2 * | 5/2017 | Szawarski ............. B60K 15/05 |
| D806,513 | S | 1/2018 | Curic |
| 10,053,893 | B1 | 8/2018 | Patel |
| 10,253,533 | B1 | 4/2019 | Pudney |
| 10,655,371 | B2 | 5/2020 | Soonthornwinate |
| 10,934,748 | B2 | 3/2021 | Harajli |
| 10,941,603 | B2 | 3/2021 | Linden |
| 11,027,646 | B2 | 6/2021 | Kothe |
| 11,040,615 | B2 * | 6/2021 | Herzig ................... B60K 15/05 |
| 11,479,995 | B2 | 10/2022 | Löw et al. |
| 2004/0177478 | A1 | 9/2004 | Louvel |
| 2005/0121924 | A1 | 6/2005 | Chanya |
| 2006/0279095 | A1 | 12/2006 | Ishiguro |
| 2008/0163555 | A1 | 7/2008 | Thomas |
| 2009/0058132 | A1 | 3/2009 | Browne |
| 2013/0079984 | A1 | 3/2013 | Aerts |
| 2013/0127185 | A1 | 5/2013 | Lang |
| 2014/0000167 | A1 | 1/2014 | Patel |
| 2014/0300115 | A1 | 10/2014 | Vasi |
| 2015/0048644 | A1 * | 2/2015 | Georgi ................... E05B 83/34 296/97.22 |
| 2015/0315812 | A1 | 11/2015 | Vasi |
| 2016/0010369 | A1 | 1/2016 | Specht |
| 2016/0208523 | A1 | 7/2016 | Bingle |
| 2017/0066312 | A1 | 3/2017 | Coutier |
| 2019/0078360 | A1 | 3/2019 | Blount |
| 2019/0100948 | A1 | 4/2019 | Low |
| 2019/0234121 | A1 | 8/2019 | Pudney |
| 2019/0368239 | A1 | 12/2019 | Rhein |
| 2020/0308883 | A1 | 10/2020 | Bresser |
| 2020/0332575 | A1 | 10/2020 | Christensen |
| 2020/0362604 | A1 | 11/2020 | Jarnicki |
| 2021/0062558 | A1 | 3/2021 | Beck |
| 2021/0332619 | A1 | 10/2021 | Peterson |
| 2022/0042356 | A1 | 2/2022 | Herdering |
| 2022/0268063 | A1 | 8/2022 | Vrsecký |
| 2022/0282533 | A1 | 9/2022 | Schütz |
| 2023/0258029 | A1 | 8/2023 | Philippe |
| 2024/0093537 | A1 | 3/2024 | Wilke |
| 2024/0125154 | A1 | 4/2024 | Peterson |
| 2024/0246409 | A1 * | 7/2024 | Zerbe ..................... B60K 15/05 |

FOREIGN PATENT DOCUMENTS

| | | |
|---|---|---|
| CN | 209723950 U | 12/2019 |
| CN | 112443217 A | 3/2021 |
| CN | 115538871 A | 12/2022 |
| DE | 19642687 A1 | 4/1998 |
| DE | 19919251 A1 | 11/2000 |
| DE | 69803826 T2 | 11/2002 |
| DE | 19740827 B4 | 6/2006 |
| DE | 102011017240 A1 | 12/2011 |
| DE | 102010053137 A1 | 6/2012 |
| DE | 102013212083 A1 | 1/2014 |
| DE | 102012020710 A1 | 4/2014 |
| DE | 102014103642 A1 | 8/2015 |
| DE | 102014109738 A1 | 12/2015 |
| DE | 102016112423 A1 | 1/2017 |
| DE | 202017104635 U1 | 10/2017 |
| DE | 102016109933 A1 | 11/2017 |
| DE | 102016110869 A1 | 12/2017 |
| DE | 102017008108 A1 | 1/2018 |
| DE | 102017101247 A1 | 7/2018 |
| DE | 102017212397 A1 | 1/2019 |
| DE | 202019103205 U1 | 7/2019 |
| DE | 102018109474 A1 | 10/2019 |
| DE | 102017124368 B4 | 3/2020 |
| DE | 102018128972 A1 | 5/2020 |
| DE | 102019106436 A1 | 9/2020 |
| DE | 102019206282 A1 | 11/2020 |
| DE | 202021001685 U1 | 6/2021 |
| DE | 102020117046 B3 | 9/2021 |
| DE | 102020113492 A1 | 11/2021 |
| DE | 102020130235 A1 | 5/2022 |
| DE | 102022105502 A1 | 9/2022 |
| DE | 102021002425 A1 | 11/2022 |
| DE | 202022104963 U1 | 12/2022 |
| DE | 102017126077 B4 | 1/2023 |
| DE | 202023104889 U1 | 11/2023 |
| DE | 102020209607 A1 | 12/2023 |
| DE | 102020209609 A1 | 2/2024 |
| DE | 102023118359 A1 | 1/2025 |
| EP | 0681075 A2 | 11/1995 |
| EP | 1081319 A1 | 3/2001 |
| EP | 1944436 A2 | 7/2008 |
| EP | 3122967 A1 | 2/2017 |
| EP | 3712362 A1 | 9/2020 |
| EP | 3734002 A1 | 11/2020 |
| EP | 3322870 B1 | 10/2021 |
| EP | 3430217 B1 | 1/2022 |
| EP | 4019312 A1 | 6/2022 |
| EP | 4258312 A2 | 10/2023 |
| FR | 3034802 A1 | 10/2016 |
| FR | 3054582 A1 | 2/2018 |
| FR | 3096713 A1 | 12/2020 |
| JP | S629655 U | 1/1987 |
| WO | 9952727 A1 | 10/1999 |
| WO | 0034604 A1 | 6/2000 |
| WO | 0208550 A2 | 1/2002 |
| WO | 0229184 A1 | 4/2002 |
| WO | 2011047649 A1 | 4/2011 |
| WO | 2012021782 A2 | 2/2012 |
| WO | 2012151403 A1 | 11/2012 |
| WO | 2015114154 A2 | 8/2015 |
| WO | 2015144526 | 10/2015 |
| WO | 2016077068 A1 | 5/2016 |
| WO | 2017211500 A1 | 12/2017 |
| WO | 2018219268 A1 | 12/2018 |

* cited by examiner

ACTUATING MECHANISM FOR ACTUATING COVERS FOR VEHICLES

RELATED APPLICATIONS

The present application claims the benefit of German Patent Application Nos. DE 10 2022 125 527.1, filed Oct. 4, 2022, and DE 10 2023 103 567.3, filed Feb. 14, 2023, the contents of which are hereby incorporated by reference.

BACKGROUND

Vehicles with modern assistance systems often comprise LIDAR sensors, for example, which serve to detect objects in the vicinity of the vehicle. For this purpose, individual light pulses or laser beams are transmitted from the LIDAR sensor into the environment. Typically, LIDAR sensors for automotive applications emit laser beams in a wavelength range that is invisible to the human eye. This is usually infrared radiation with a wavelength of 800 nm to 2500 nm. If the single laser beam is reflected off of an object in the environment, for example a vehicle, back to the LIDAR sensor, the distance between the LIDAR sensor and the object can be deduced based on the time-of-flight of the single laser beam.

In order to emit the light pulses or laser beams in different directions, to receive them, and to direct them towards a detector, various mirror systems are known in the context of LIDAR sensors according to the prior art. With such mirror systems, the light pulse or laser beam can be directed in a particular direction of the environment. The environment is thus sampled with several thousand pulses of light or laser beams. For this purpose, the mirror systems for receiving the laser beams reflected back to the LIDAR sensor must be precisely aligned in the direction of transmission.

Due to the necessary precision of a LIDAR sensor assembly, this assembly is a constructively expensive and costly unit, so that the LIDAR assembly must be kept as protected as possible and not accessible from the outside in the parked state of the vehicle. Moreover, in the parked state of the vehicle, the LIDAR assembly is intended to be protected from external influences or temperature, humidity, or the like. Thus, it is desirable to accommodate the LIDAR sensor technology in a sensor recess, which can be protected with a cover.

Such covers are typically connected to a hinge arm of an actuating mechanism, which forms the corresponding flap that can be pivoted between an open position that uncovers the opening and a closed position that covers the opening.

Known actuating mechanisms can be designed so as to move the covers in various ways between the closed position and the open position. For example, actuating mechanisms that pivot the cover outward are known, in particular.

In addition to a frequently low user comfort when covering and releasing, the disadvantage of such actuating mechanisms is in particular the relatively high space requirement, for example of electric vehicles during a charging operation. The high space requirement results from the covers being pivoted outwardly when charging connectors are released and often projecting from the vehicle at a 90° angle in an open state.

The covers projecting from the vehicle pose a sometimes difficult-to-see obstacle for pedestrians, in particular, with which they can collide. In this case, not only personal injury but also damage to the cover itself can occur. In addition, the covers protruding from the vehicle often fall victim to vandalism, because the covers can easily be bent off of a vehicle due to their unfavorable angle.

Moreover, protruding covers increase the air resistance of the vehicle when the vehicle travels, for example when the covers are used in connection with a LIDAR sensor system.

In this respect, actuating mechanisms are preferred which are configured so as to move the cover behind the vehicle outer shell and thus release the opening.

In this context, for example, a mechanism is known from the publication DE 20 2021 001 685 U1, with which a cover is first pulled behind the vehicle body in a linear movement proceeding from a closed position, wherein the cover is subsequently pivoted into the open position behind the vehicle body. For the actuating mechanism, a gear train having a rack is used.

The disadvantage of the mechanism known from the publication DE 20 2021 001 685 U1 is, in particular, that the gear train with the associated rack is arranged at least in regions in the charging recess, that is to say in the wet region, and thus subject to weather effects. The mechanism known from this prior art therefore has a relatively high wear behavior. In particular, there is a risk that, for example due to soiling of the gear train or due to wear of the gear train, the movement of the cover from the closed position into the open position (and vice versa) can no longer be fully realized.

A further disadvantage of the mechanism known from the publication DE 20 2021 001 685 U1 can also be seen in particular in the fact that the mechanism is only conditionally able to transfer an iced cover from its closed position into the open position, if at all. If the cover becomes iced in its closed position, for example due to ice rain, it is only possible to move the cover from its closed position into the open position with the aid of an excessively increased force. For this purpose, the actuator must be sized accordingly, which in turn requires an increased construction space, which is often not available.

Based on the aforementioned situation, the problem addressed by the disclosure is to optimize the actuating mechanism known therein such that it enables a complex movement pattern of the cover while having a simple design, wherein, in particular, the pivoting mechanism operates in as low-wear a manner as possible, even in the wet region.

In addition, an effective ice-breaking function should be viable without needing to design the components larger, in particular the drive of the pivoting mechanism.

SUMMARY

The present disclosure relates generally to an actuating mechanism for actuating covers for vehicles, substantially as illustrated by and described in connection with at least one of the figures, as set forth more completely in the claims. In particular, covers for charging, service, or fueling flaps or sensor, and in particular LIDAR sensor, systems.

According to a further aspect of the present disclosure, it relates to an assembly, in particular a sensor, preferably a LIDAR system assembly, or a charging, service, or fueling assembly for vehicles, wherein the assembly comprises, among other things, the actuating mechanism according to the disclosure. The disclosure further relates to a vehicle having a corresponding sensor assembly, in particular a LIDAR system assembly, or having a charging, service, or fueling assembly.

BRIEF DESCRIPTION OF THE DRAWINGS

The foregoing and other objects, features, and advantages of the devices, systems, and methods described herein will be apparent from the following description of particular examples thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1:
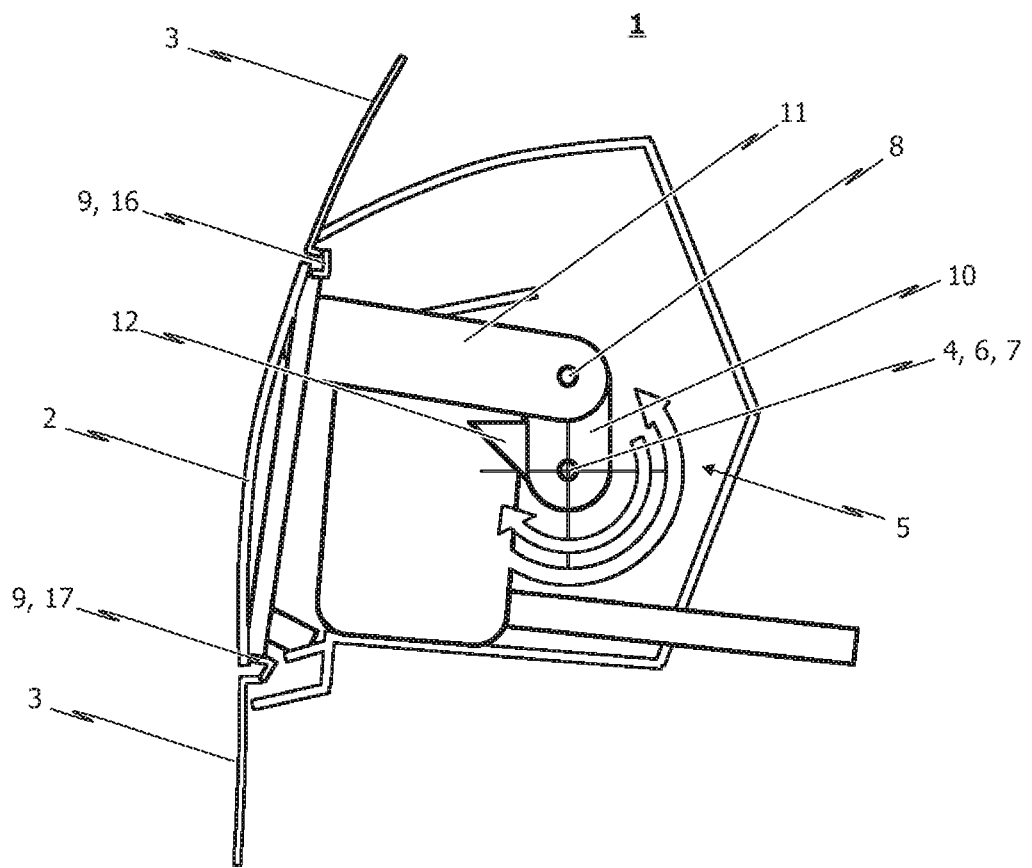
FIG. 1 illustrates schematically and in a cross-sectional view, a first exemplary embodiment of the actuating mechanism according to the present disclosure, wherein the cover of the charging, service, or fueling assembly is in its closed position.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within and/or including the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

Movable covers are used at various locations in the vehicle. In principle, these serve to conceal or cover an opening or surface to be covered in or on a vehicle. In particular, such covers are used for fueling flaps, charging flaps, water flaps, or other service flaps, for example. For example, fueling or charging flaps cover a fueling recess (or charging recess) used for refueling a vehicle with fuel or, for example, a urea solution, or for charging the battery of an electric or hybrid motor vehicle. Further, corresponding covers cover sensor systems of vehicles, in particular LIDAR systems.

Accordingly, the disclosure relates in particular to an actuating mechanism for actuating a cover of a vehicle, wherein the cover is reversibly movable between a closed position, in which the cover is arranged in particular flush and preferably stake-flush with a vehicle body and in particular a vehicle outer shell, and an open position in which the cover is arranged at least partially or regionally behind the vehicle body and in particular the vehicle outer shell. For this purpose, the actuating mechanism preferably comprises a drive, in particular in the form of an electric motor, with a drive shaft and a movement mechanism or joint mechanism operatively connected to the rear side of the cover and the drive.

Accordingly, the actuating mechanism according to the disclosure is an actuating mechanism that is capable of moving a cover or vehicle flap between an open position and a closed position and vice versa, wherein the actuating mechanism can in particular automatically expose or close an opening in a vehicle contour, for example a vehicle body. As with the actuating mechanism known from publication DE 20 2021 001 685 U1, an interface can be provided within the opening, which is rearwardly offset towards the interior of the vehicle with reference to the vehicle contour and is fixedly arranged on the vehicle.

The actuating mechanism according to the disclosure is thus particularly suitable for actuating a cover in the form of a charging, service, or fueling flap of a vehicle. Alternatively, the actuating mechanism according to the present disclosure is suitable for actuating a flap for the sensor cover of a vehicle, and in particular for the LIDAR system cover of a vehicle.

Compared to the actuating mechanism known from publication DE 20 2021 001 685 U1, the actuating mechanism according to the disclosure is characterized by the fact that a gear train with a rack is not provided as the movement or joint mechanism, which first pulls/moves the cover in a linear movement into the vehicle interior in order to transfer the cover from its closed position into its open position and then rotationally slides the cover behind the vehicle body or vehicle outer shell.

Rather, the actuating mechanism according to the disclosure is the movement mechanism which, as a hinge or guiding mechanism, is preferably configured such that, upon actuation of the drive proceeding from the closed position of the cover, it initially moves said cover in a rotational and translational movement, in particular superposed according to the superposition principle, into an intermediate position in which the cover is in a position where it is pivoted relative to the closed position of the cover about a first axis of rotation and is located in particular partially or regionally behind the vehicle body and in particular behind the vehicle outer shell. In particular, in the intermediate position, the cover is in a position which is at least partially or regionally rearwardly offset towards the interior of the vehicle, compared to the closed position.

The movement mechanism or joint mechanism is further configured such that, upon a further actuation of the drive, proceeding from the aforementioned intermediate position of the cover, it subsequently pivots the cover in an at least substantially and preferably purely rotational movement about a second axis of rotation into the open position, in which the cover is arranged at least partially or regionally behind the vehicle body and in particular behind the vehicle outer shell.

The advantages achievable with the solution according to the disclosure are clear: due to the fact that, upon actuation of the drive proceeding from the closed position of the cover, it is initially moved in a rotational and translational movement, in particular superposed according to the superposition principle, into an intermediate position, it is ensured that the gasket region between the cover and the edge region of the opening covered by the cover is unevenly stressed. In other words, by moving the cover into the intermediate position in a rotational and translational movement, in particular superposed according to the superposition principle, a first region of the edge of the cover detaches faster from the edge region of the opening than an opposite region of the cover.

In this way, a greater moment of force is exerted on the region of the cover that detaches more quickly from the edge region of the opening, as a result of which a possibly existing icing can be safely detached without the actuator having to be designed in a correspondingly oversized manner. This is a significant advantage compared to the actuating mechanism known from DE 20 2021 001 685 U1, for example, in which the cover is initially moved into the intermediate position in a purely translational movement proceeding from the closed position.

On the other hand, with regard to the movement sequence, it is still ensured that the cover can always be moved in the interior of the vehicle, that is to say, rearwardly offset from the vehicle contour. Thus, parts or edges projecting from the vehicle contour (body) are avoidable in every movement phase, as in the actuating mechanism known from DE 20 2021 001 685 U1. In particular, damage or injuries to or due to the cover in the open state can be effectively avoided.

In the closed position, the cover aligns with the vehicle contour and closes the opening in a preferably strake-flush manner.

In order to achieve a particularly compact construction of the actuating mechanism, it is provided according to implementations of the present disclosure that the first axis of rotation about which the cover is movable into the intermediate position in a rotational and translational movement, in particular superposed according to the superposition principle, matches the second axis of rotation about which the cover is pivotable into the open position proceeding from the intermediate position.

In this context, in particular, it is sensible that the first and preferably also the second axis of rotation matches an axis of rotation of the drive shaft of the drive.

According to one aspect of the disclosure, in order to protect the interior of the recess that can be covered by the cover against weather effects and in particular against moisture, it is provided that the cover is associated with a gasket which partially or regionally surrounds the cover and is configured so as to seal off a region between the cover and the vehicle body, in particular the vehicle outer shell, at least in the closed position of the cover.

The movement mechanism or joint mechanism is in particular configured such that, upon actuation of the drive, proceeding from the closed position of the cover, it moves said cover to the intermediate position in a rotational and translational movement, in particular superposed according to the superposition principle, in such a way that the gasket, which in particular partially or regionally surrounds the cover, moves faster in a first region of the gasket relative to the cover or relative to the vehicle body, in particular the vehicle outer shell, than in a second region of the gasket that in particular lies opposite the first region of the gasket. In this way, an ice-breaking function is effectively implemented.

In order to realize the movement mechanism or joint mechanism of the actuating mechanism in as simple a manner as possible and nevertheless effectively, it is provided in particular that the movement mechanism or joint mechanism comprises a lever rotatably supported about the first pivot axis, in particular a push-out lever, and a hinge arm, wherein a first end region of the hinge arm is preferably fixedly connected or connectable to in particular the rear side of the cover, and wherein an opposite second end region of the hinge arm is connected to the lever in an articulated manner.

In this context, it is sensible that, at least over a defined or definable angular range, the hinge arm is pivotable via its second end region about a third axis of rotation relative to the lever, wherein the third axis of rotation preferably extends parallel to the first axis of rotation about which the lever is rotatably supported.

Alternatively or in addition to the last mentioned aspect, it is contemplated that the lever comprises a tappet, which is configured so as to also move and in particular rotate the hinge arm when the lever is moved.

In this context, it is contemplated, for example, that, proceeding from a resting position of the lever in which the cover is in its closed position, the tappet is configured so as to enter into contact with the hinge arm only after rotation of the lever about a defined or definable angular range about the first axis of rotation of the lever, wherein, at that time and upon a further rotation of the lever, the lever is additionally pivoted with the hinge arm about the first axis of rotation of the lever.

In this way, without the use of a gear train, the relatively complex movement sequence of the cover is realizable in a reproducible manner.

It is contemplated in this context, in particular, that after rotation of the lever about the defined or definable angular range about the first axis of rotation of the lever, the cover is in its intermediate position.

In principle, it is contemplated that a spring mechanism and/or a mechanical blockage is associated with the movement mechanism or joint mechanism, which is configured so as to hold the hinge arm and the lever together when the tappet enters or has entered into contact with the hinge arm.

According to design variants of the actuating mechanism according to the disclosure, it is provided that the cover is movable from the open position to a weather-protective position, in which the cover is partially rotated back into the closed position about the first axis of rotation of the lever.

In a further alternative or additional embodiment of the actuating mechanism according to the disclosure, it is provided that the cover comprises on the rear side a fluid passage system with at least one fluid passageway, wherein the fluid passage system is in particular configured such that, in the open position of the cover, the at least one fluid passageway forms a fluid connection to a filling nozzle of the vehicle.

The disclosure further relates to an assembly, in particular a sensor assembly, preferably a LIDAR system assembly, or a charging, service, or fueling assembly for vehicles, wherein the assembly comprises a recess, in particular a sensor recess, in particular a LIDAR system recess, or a charging, service, or fueling recess as well as a cover for covering the recess. The cover is reversibly movable and in particular pivotable between a closed position in which the cover is arranged so that it is flush with an outer shell of the vehicle and an open position in which the cover is arranged behind the outer shell.

For this purpose, the assembly according to the disclosure comprises in particular an actuating mechanism of the aforementioned type according to the disclosure.

In this context in particular, it is provided that the drive shaft and/or the drive surface of the drive of the actuating mechanism is arranged behind the recess.

The disclosure further relates to a vehicle having a sensor, in particular a LIDAR system assembly, or having a charging, service, or fueling assembly of the aforementioned type according to the disclosure.

Embodiments of the present disclosure are described in further detail in the following with reference to the accompanying drawings.

A first exemplary embodiment of the actuating mechanism 1 according to the disclosure is shown schematically and in a cross-sectional view in FIG. 1, wherein the cover 2 is in its closed position.

Figure 2:
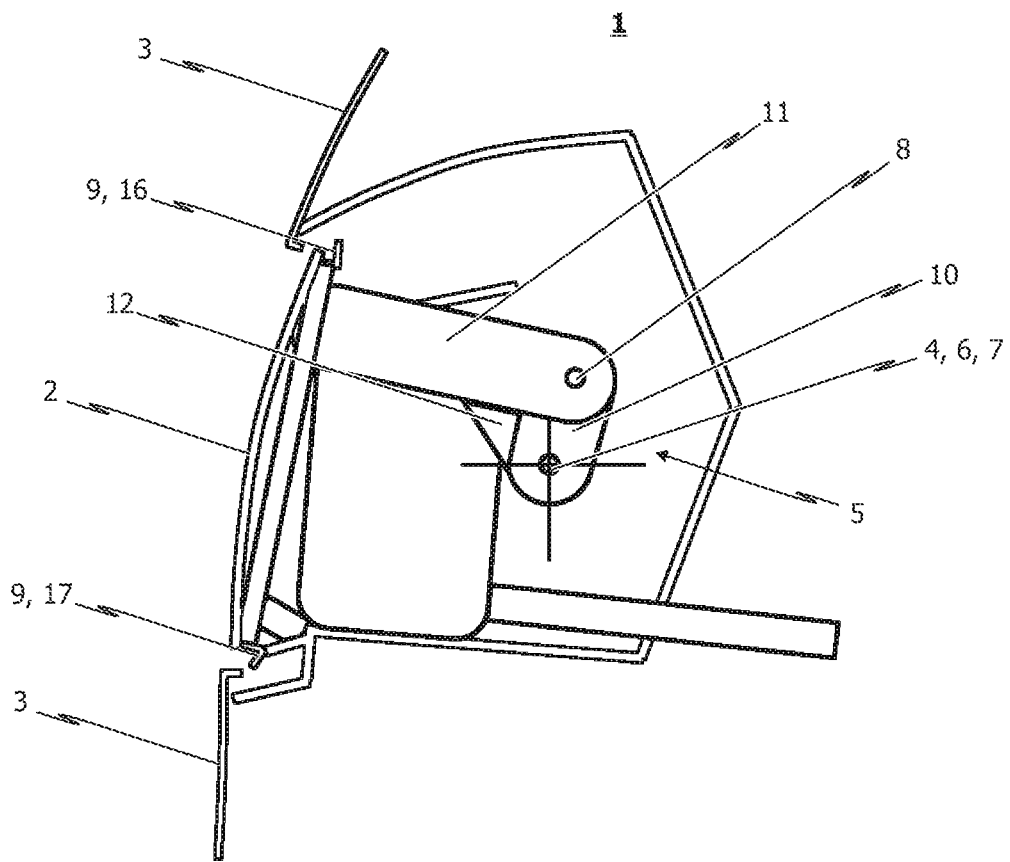
FIG. 2 illustrates schematically and in a cross-sectional view, the first exemplary embodiment of the actuating mechanism according to FIG. 1, wherein the cover of the charging, service, or fueling assembly has been moved from its closed position according to FIG. 1 in a rotational and translational movement, in particular superposed according to the superposition principle, i.e., into the recess of the charging, service, or fueling assembly, inwardly into its intermediate position.
Figure 3:
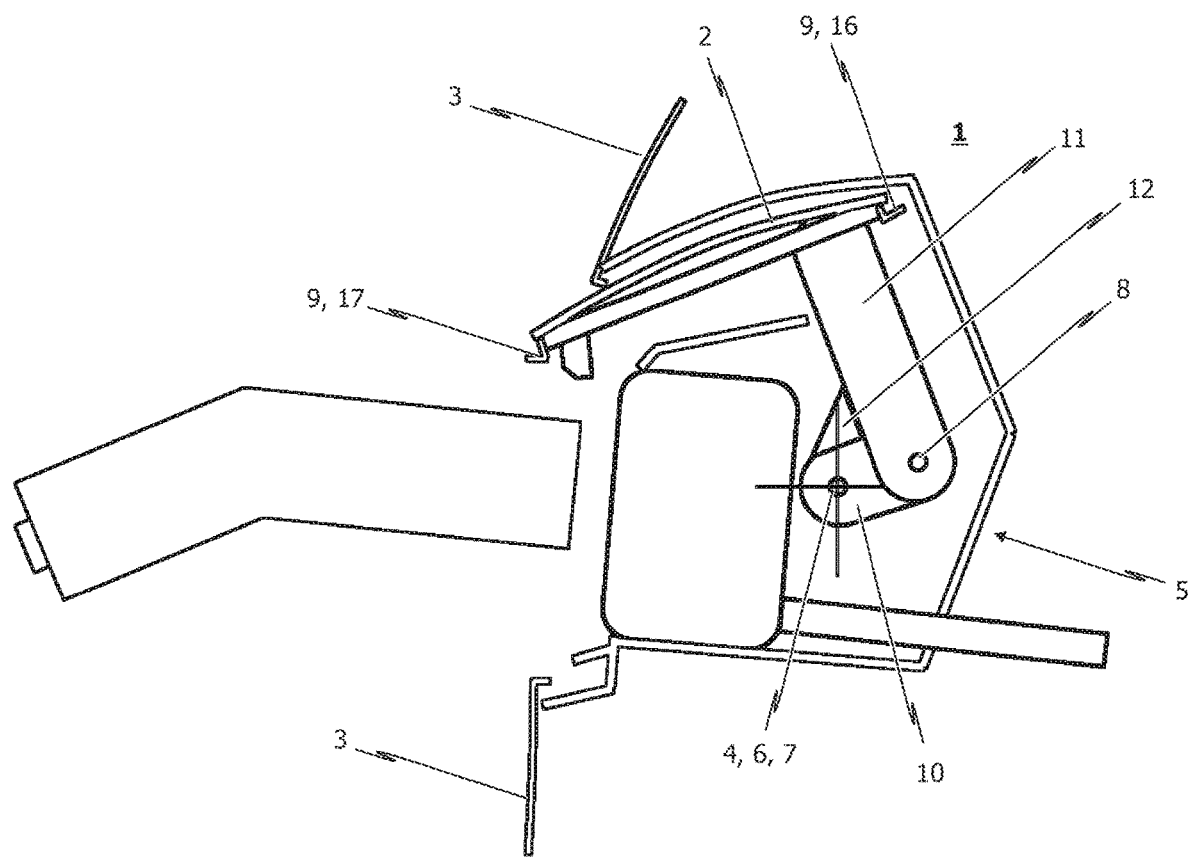
FIG. 3 illustrates schematically and in a cross-sectional view, the first exemplary embodiment of the actuating mechanism according to FIG. 1, wherein the cover of the charging, service, or fueling assembly has been pivoted from its intermediate position according to FIG. 2 into its open position in at least a substantially purely rotational movement.
Figure 4:
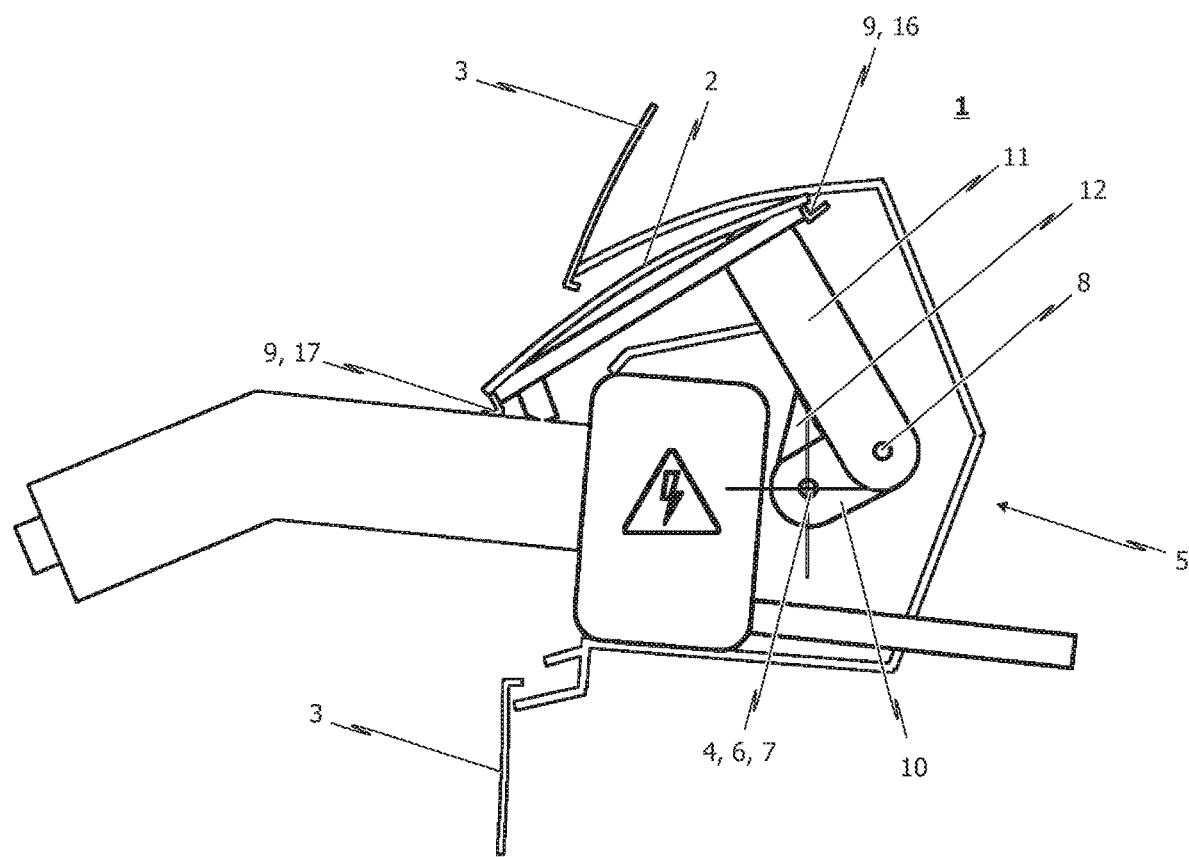
FIG. 4 illustrates schematically and in a cross-sectional view, the first exemplary embodiment of the actuating mechanism according to FIG. 1, wherein the cover of the charging, service, or fueling assembly has been pivoted from its open position according to FIG. 3 in at least substantially a purely rotational movement in its weather-protective position.

In FIG. 2, the cover 2 is moved into its intermediate position in a rotational and translational movement, superposed according to the superposition principle, In FIG. 3, the cover 2 is then moved in a pure rotational movement in its open position, while in FIG. 4, the cover 2 is in a weather-protected position.

The actuating mechanism 1 comprises a drive (not further shown in the drawings), in particular in the form of an electric motor with a drive shaft 3. Moreover, the actuating mechanism 1 comprises a movement mechanism or joint mechanism 5, which is in particular operatively connected with the rear side of the cover 2 and with the drive.

A combined view of FIG. 1 to FIG. 4, reveals that, upon actuation of the drive proceeding from the closed position of the cover 2 according to FIG. 1, it initially moves said cover in a rotational and translational movement, in particular superposed according to the superposition principle, into the intermediate position according to FIG. 2, in which the cover 2 is in a position where the cover 2 is pivoted relative to the closed position of the cover 2 about a first axis of rotation 6 and is located at least partially or regionally behind the vehicle body and in particular behind the vehicle outer shell 3.

Upon a further actuation of the drive, proceeding from the intermediate position of the cover 2 according to FIG. 2, the cover is subsequently pivoted in an at least substantially and preferably purely rotational movement about a second axis of rotation 7 into the open position, in which the cover 2 is arranged at least partially or regionally behind the vehicle body and in particular behind the vehicle outer shell 3.

In the embodiment shown in the illustrations, it is provided that the first axis of rotation 6 about which the cover 2 is movable into the intermediate position in a rotational and translational movement, in particular super-posed according to the superposition principle, matches the second axis of rotation 7 about which the cover 2 is pivotable into the open position proceeding from the intermediate position. In particular, it is provided that the first and second axis of rotation 6, 7 match the axis of rotation of the drive shaft 3 of the drive.

Figure 5:
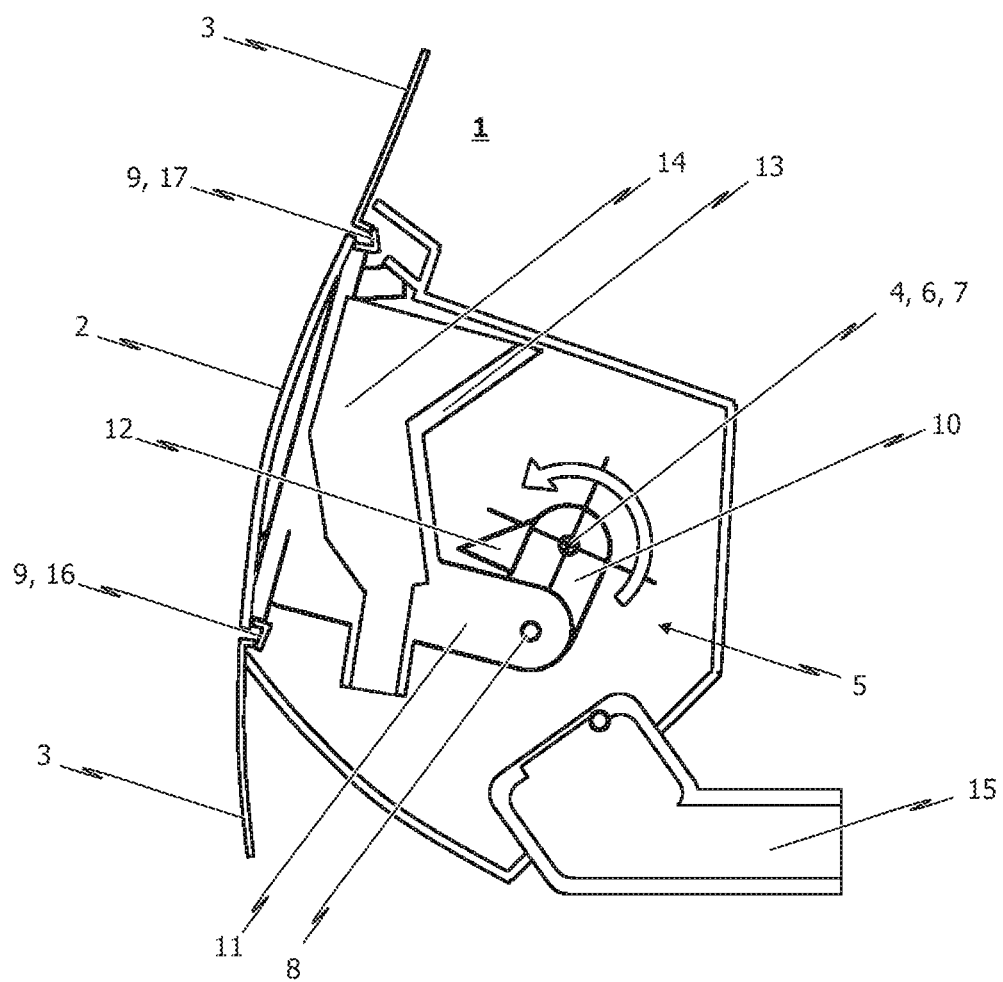
FIG. 5 illustrates schematically and in a cross-sectional view, a second exemplary embodiment of the actuating mechanism according to the present disclosure, wherein the cover of the charging, service, or fueling assembly is in its closed position.

In the drawings, it is further indicated that the cover 2 is associated with a gasket 9 that partially or regionally surrounds the cover 2 and is configured so as to seal off a region between the cover 2 and the vehicle body, in particular the vehicle outer shell 3, at least in the closed position of the cover 2 (cf., for example, FIG. 1 or FIG. 5).

The movement mechanism or joint mechanism 5 is in particular configured such that, upon actuation of the drive, proceeding from the closed position of the cover (cf., for example, FIG. 1 or FIG. 5), it moves said cover 2 to the intermediate position in a rotational and translational movement, in particular superposed according to the superposition principle (cf. FIG. 2 or FIG. 6), in such a way that the gasket 9, which in particular partially or regionally surrounds the cover 2, moves faster in a first region 16 of the gasket 9 (here: in an upper region of the gasket 9 in FIG. 1 to FIG. 4 or in a lower region of the gasket 9 in FIG. 5 to FIG. 7) relative to the cover 2 or relative to the vehicle body, than in a second region 17 of the gasket 9 that in particular lies opposite the first region 16 of the gasket 9.

Both the first and the second exemplary embodiment of the actuating mechanism 1 shown in the drawings have in common that the movement mechanism or joint mechanism 5 comprises a lever 10, in particular a push-out lever, which is rotatably supported about the first axis of rotation 6, and a hinge arm 11, wherein a first end region of the hinge arm 11 is preferably fixedly connected or connectable to the rear side of the cover 2, in particular. On the other hand, an opposite second end region of the hinge arm 11 is connected to the lever 10 in an articulated manner.

It is provided that, at least over a defined or definable angular range, the hinge arm 11 is pivotable via its second end region about a third axis of rotation 8 relative to the lever 10, wherein the third axis of rotation 8 preferably extends parallel to the first axis of rotation 6 about which the lever 10 is rotatably supported.

The embodiments of the actuating mechanism 1 according to the disclosure as shown in the drawings further have in common that the lever 10 comprises a driver 12, which is configured so as to also move and in particular rotate the hinge arm 11 when the lever 10 is moved.

Figure 6:
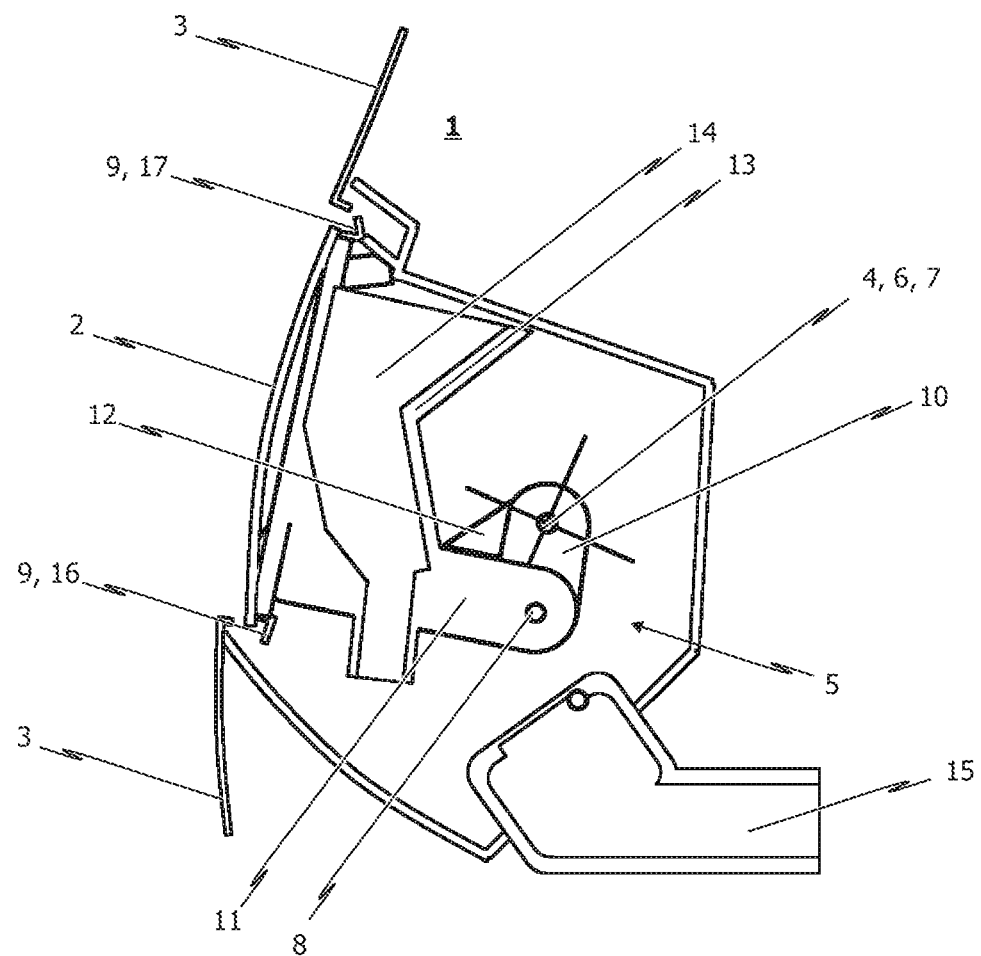
FIG. 6 illustrates schematically and in a cross-sectional view, the second exemplary embodiment of the actuating mechanism according to FIG. 5, wherein the cover of the charging, service, or fueling assembly has been moved from its closed position according to FIG. 5 in a rotational and translational movement, in particular superposed according to the superposition principle, i.e., into the recess of the charging, service, or fueling assembly, inwardly into its intermediate position.
Figure 7:
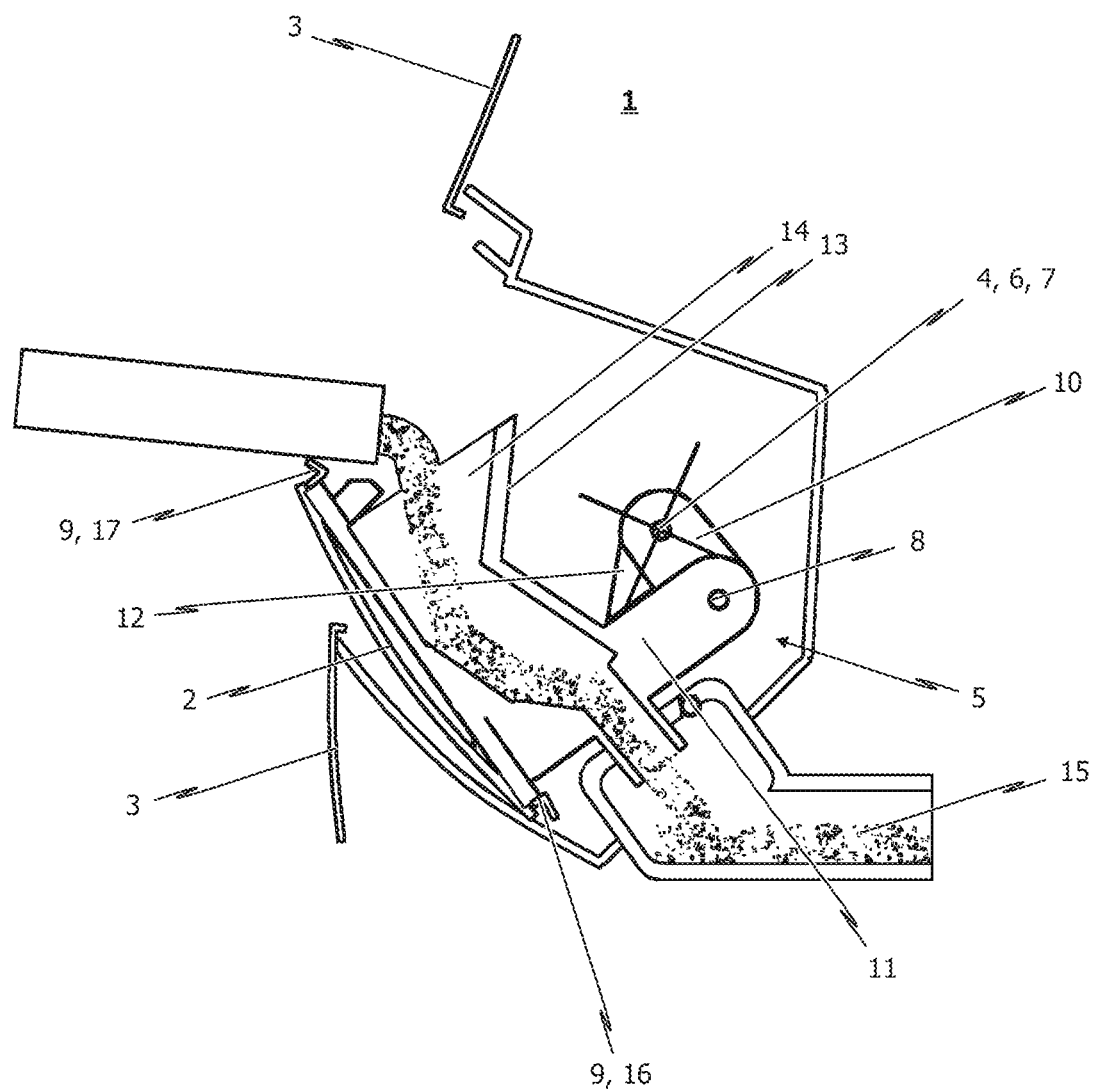
FIG. 7 illustrates schematically and in a cross-sectional view, the second exemplary embodiment of the actuating mechanism according to FIG. 5, wherein the cover of the charging, service, or fueling assembly is pivoted from its intermediate position according to FIG. 6 in at least substantially a purely rotational movement in its open position.

In particular, proceeding from a resting position of the lever 10 in which the cover 2 is in its closed position (cf. FIG. 1 or FIG. 5), the tappet 12 is configured so as to enter into contact with the hinge arm 11 only after rotation of the lever 10 about a defined or definable angular range about the first axis of rotation 6 of the lever 10 (cf. FIG. 2 and FIG. 6), wherein, at that time and upon a further rotation of the lever 10, the lever 10 is additionally pivoted with the hinge arm 11 about the first axis of rotation 6 of the lever 10 (cf. FIG. 3 and FIG. 7).

As shown in FIG. 4, it is contemplated in particular that the cover 2 can be moved from the open position into a weather-protective position, in which the cover 2 is partially rotated back into the closed position about the first axis of rotation 6 of the lever 10.

According to the second exemplary embodiment shown in FIG. 5 to FIG. 7, the cover 2 can comprise on the rear side a fluid passage system 13 having at least one fluid passage 14, wherein the fluid passage system 13 is configured such that, in the open position of the cover 2, the at least one fluid passage 14 forms a fluid connection to a filling nozzle 15 of the vehicle.

The disclosure is not limited to the embodiments shown in the drawings, but rather results when all of the features disclosed herein are considered together.

What is claimed is:

1. An actuating mechanism for actuating a cover of a vehicle, wherein the cover is arranged so as to be reversible between a closed position in which the cover is arranged flush with a vehicle body and an open position in which the cover is arranged at least partially behind the vehicle body, wherein the actuating mechanism comprises a movement mechanism that is operatively connected to a rear side of the cover,
Wherein the movement mechanism is configured to:
   (a) in order to transition the cover from the closed position into the open position proceeding from the closed position of the cover, move the cover initially into an intermediate position in a rotational and translational movement, in which intermediate position the cover is pivoted relative to the closed position of the cover about a first axis of rotation and is at least partially or regionally offset in comparison to the closed position backwards towards an interior of the vehicle; and
   (b) proceeding from the intermediate position of the cover, pivot the cover in an at least substantially and preferably purely rotational movement about a second axis of rotation into the open position, in which the cover is arranged at least partially or regionally behind the vehicle body.

2. The actuating mechanism according to claim 1, wherein the first axis of rotation about which the cover is movable into the intermediate position in the rotational and translational movement matches the second axis of rotation about which the cover is pivotable into the open position proceeding from the intermediate position.

3. The actuating mechanism according to claim 1, wherein the actuating mechanism further comprises a drive having a drive shaft, wherein the drive is operatively connected to the movement mechanism, wherein the first or second axis of rotation matches an axis of rotation of the drive shaft of the drive.

4. An assembly comprising the following:
a recess, in particular a sensor recess, in particular a LIDAR system recess, or a charging, service, or fueling recess;
a cover for covering the recess, wherein the cover is reversibly movable and in particular pivotable between a closed position in which the cover is arranged flush with a vehicle outer shell and an open position in which the cover is arranged behind the outer shell; and
an actuating mechanism according to claim 3,
   wherein the drive shaft and/or the drive is preferably arranged behind the recess.

5. A vehicle having a sensor assembly, in particular a LIDAR system assembly, or having a charging, service, or fueling assembly according to claim 4.

6. The actuating mechanism according to claim 1, wherein the cover is associated with a seal that in particular partially or regionally surrounds the cover and is configured so as to seal a region between the cover and the vehicle body at least in the closed position of the cover, wherein the movement mechanism is configured so as to, when transitioning the cover from the closed position into the open position proceeding from the closed position of the cover, move the cover into the intermediate position in a rotational and translational movement such that the seal in particular partially or regionally surrounding the cover moves faster in a first region of the seal relative to the cover or to the vehicle body than in a second region of the seal that lies in particular opposite the first region of the seal.

7. The actuating mechanism according to claim 1, wherein the movement mechanism comprises a lever rotatably supported about the first axis of rotation, in particular a push-out lever, and a hinge arm, wherein a first end region of the hinge arm is preferably fixedly connected or connectable in particular to the rear side of the cover, and wherein an opposite second end region of the hinge arm is hingedly connected to the lever.

8. The actuating mechanism according to claim 7, wherein, at least over a defined or definable angular range, the hinge arm is pivotable via its second end region about a third axis of rotation relative to the lever, wherein the third axis of rotation preferably extends parallel to the first axis of rotation about which the lever is rotatably supported.

9. The actuating mechanism according to claim 7, wherein the lever comprises a tappet, which is configured so as to also move and in particular rotate the hinge arm when the lever is moved.

10. The actuating mechanism according to claim 9, wherein, proceeding from a resting position of the lever in which the cover is in its closed position, the tappet is configured so as to enter into contact with the hinge arm only after rotation of the lever about a defined or definable angular range about the first axis of rotation of the lever, wherein, at that time and upon a further rotation of the lever, the lever is additionally pivoted with the hinge arm about the first axis of rotation of the lever.

11. The actuating mechanism according to claim 10, wherein, after rotation of the lever about the defined or definable angular range about the first axis of rotation of the lever, the cover is in its intermediate position.

12. The actuating mechanism according to claim 10, wherein a spring mechanism and/or a mechanical blockage is associated with the movement mechanism, which is configured so as to hold the hinge arm and the lever together when the tappet enters or has entered into contact with the hinge arm.

13. The actuating mechanism according to claim 7, wherein the cover is movable from the open position into a weather protection position in which the cover is partially rotated back into the closed position about the first axis of rotation of the lever.

14. The actuating mechanism according to claim 1, wherein the cover comprises a fluid channel system n the rear side, having at least one fluid channel.

15. The actuating mechanism according to claim 14, wherein the fluid channel system is configured such that, in the open position of the cover, the at least one fluid channel forms a fluid connection to a filler neck of the vehicle.

16. The actuating mechanism according to claim 1, wherein the cover is a charging, service, or fueling flap.

17. The actuating mechanism according to claim 1, wherein the cover is a flap for covering a LIDAR sensor system.

18. The actuating mechanism according to claim 1, wherein the vehicle body is a vehicle outer shell.

* * * * *